United States Patent [19]

Haugwitz

[11] Patent Number: 4,961,811

[45] Date of Patent: Oct. 9, 1990

[54] AFFIXABLE - DETACHABLE PAPER AND METHOD OF USING IT

[76] Inventor: Rudiger D. Haugwitz, 5803 Walton Rd., Bethesda, Md. 20817

[21] Appl. No.: 284,415

[22] Filed: Dec. 14, 1988

[51] Int. Cl.$^5$ .......................... B32B 31/18; B32B 7/14

[52] U.S. Cl. .................................... 156/344; 156/249; 156/289; 156/291; 428/40; 428/198; 428/201; 428/211; 428/343

[58] Field of Search ............... 156/289, 291, 344, 249; 283/58; 428/40, 198, 201, 211, 343

[56] References Cited

U.S. PATENT DOCUMENTS 4,722,553 2/1988 Evans ................................ 283/58 X
4,798,401 1/1989 Greig ................................ 428/40 X

*Primary Examiner*—Robert A. Dawson
*Attorney, Agent, or Firm*—Mishrilal Jain

[57] ABSTRACT

Affixable paper that can be detached substantially non-destructively is disclosed. A non-essential portion of the affixable paper is so attached to a second paper with a moist adhesive in the form of microdots or microlines that after secure attachment, the affixable paper can be removed from the second paper in substantially original condition. The affixable paper may have cut scores to facilitate removal.

14 Claims, 4 Drawing Sheets

AFFIXABLE - DETACHABLE PAPER AND METHOD OF USING IT

BACKGROUND OF THE INVENTION

1. Technical Field

The present invention relates to affixable paper particularly of the kind which after secure attachment to a surface can be easily detached therefrom in substantially original condition.

2. Description of the Prior Art

Numerous paper articles exist on the market which allow attachment to a surface: labels, stickers, stamps, flaps of envelopes and the like. For these articles strong and lasting attachment is sought. Occasions exist where removal of the affixed paper sheet is desirable. Recently, removable self stick paper sheets have been introduced by 3M Company in the form of note pads. (P. R. Nayak; J. Ketteringham in *Breakthroughs*, Rawson Associates; as cited in *New Scientist*, Mar. 19, page 57 1987). These note sheets are self-sticking and do not require moistening. An important feature of these sheets is that they can be easily affixed to a surface and easily removed. It is the latter feature which can lead to accidental detachment of the sheet and loss of its message.

Additionally, cheque books are now available where each individual cheque of the book has attached to its backside an identically sized paper which yields a carbonless copy when the original cheque is written on. The copy sheet is attached and held into position by a row of adhesive dots which is located at the right and the left vertical edge of the backside of the original cheque. The exclusive purpose of the two rows of adhesive dots is to insure accurate transfer of letters and figures from the original cheque to the designated lines of the copy sheet. As it will become evident vide infra, the present invention is quite different because the prior art lacks the essential features of allowing the user to securely attach and then subsequently substantially non-destructively detach the attached paper.

SUMMARY OF THE INVENTION

It is, therefore, an object of the present invention to reduce the disadvantages of the prior art and provide an affixable paper that can be detached in substantially original form comprising applying single or a plurality of dots or lines of adhesion on a first paper to render the first paper securely affixable to a second paper but said first paper being detachable from the second paper in substantially original form.

A further object of the present invention is to provide an affixable paper that can be detached substantially non-destructively which comprises the use of a microencapsulated adhesive.

It is still another object of the present invention to provide an affixable paper that can be detached substantially intact or non-destructively employing cut scores or perforations in addition to the adhesive.

DETAILED DESCRIPTION OF THE INVENTION

Figure 1:
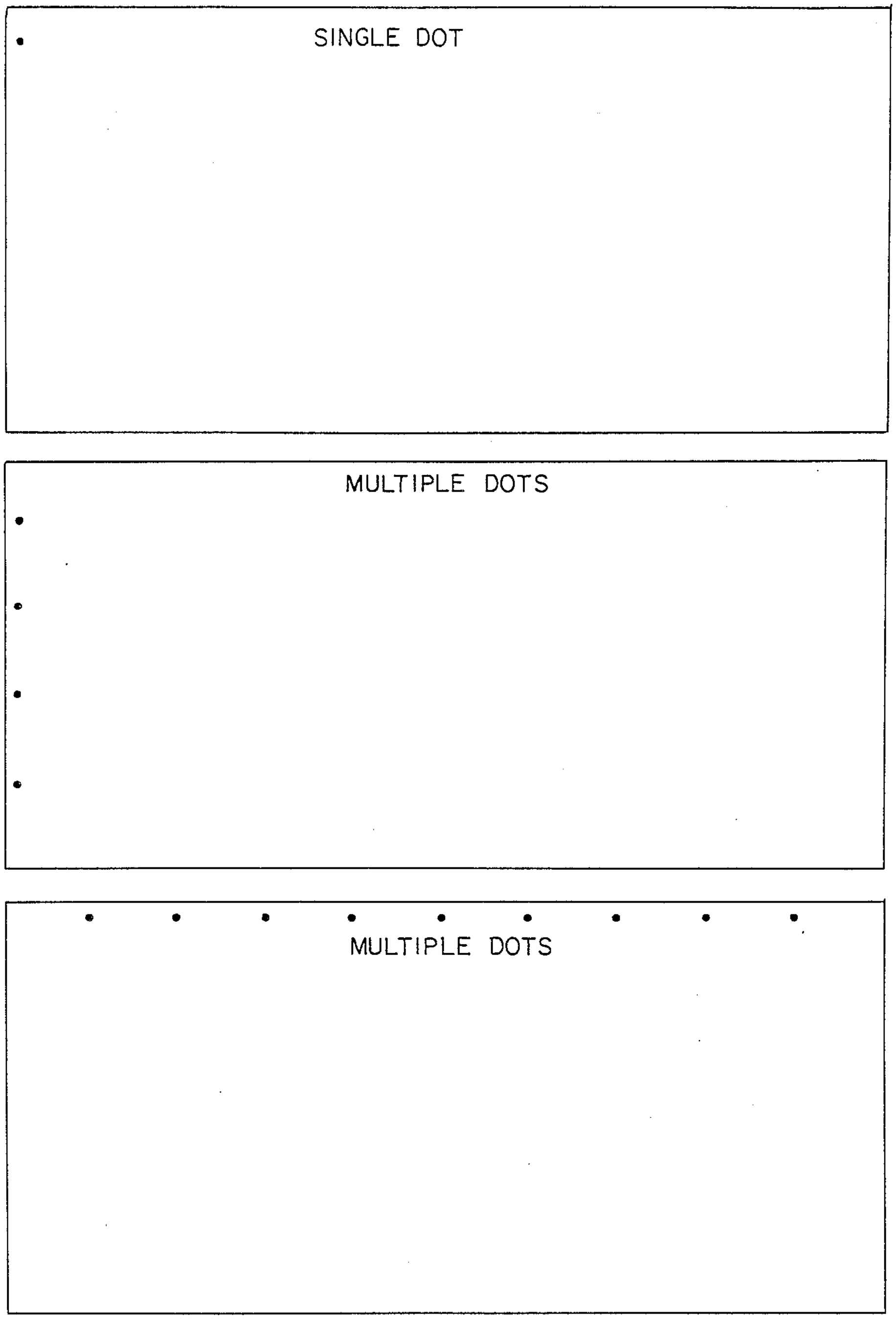
Figure 2:
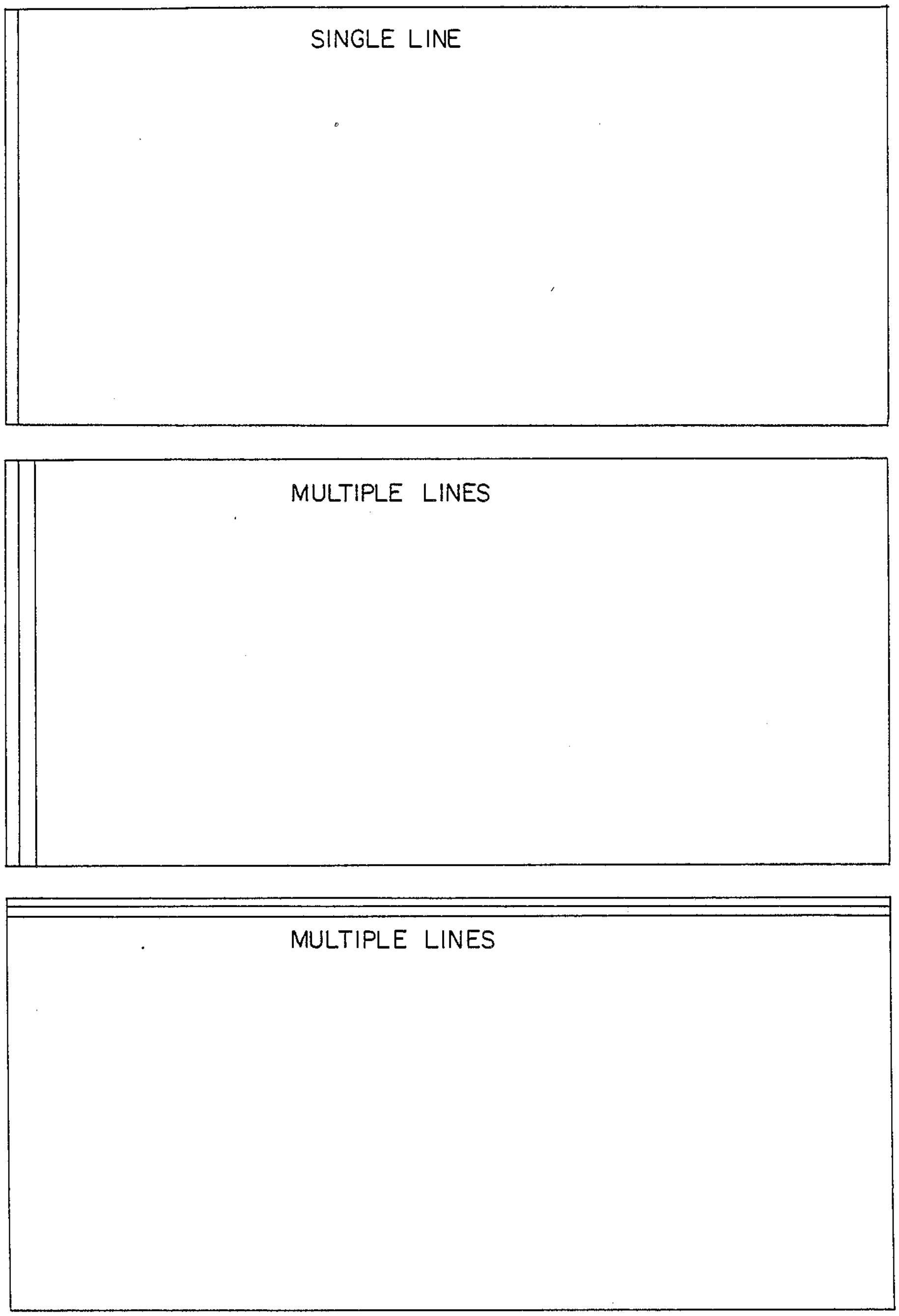
Figure 3:
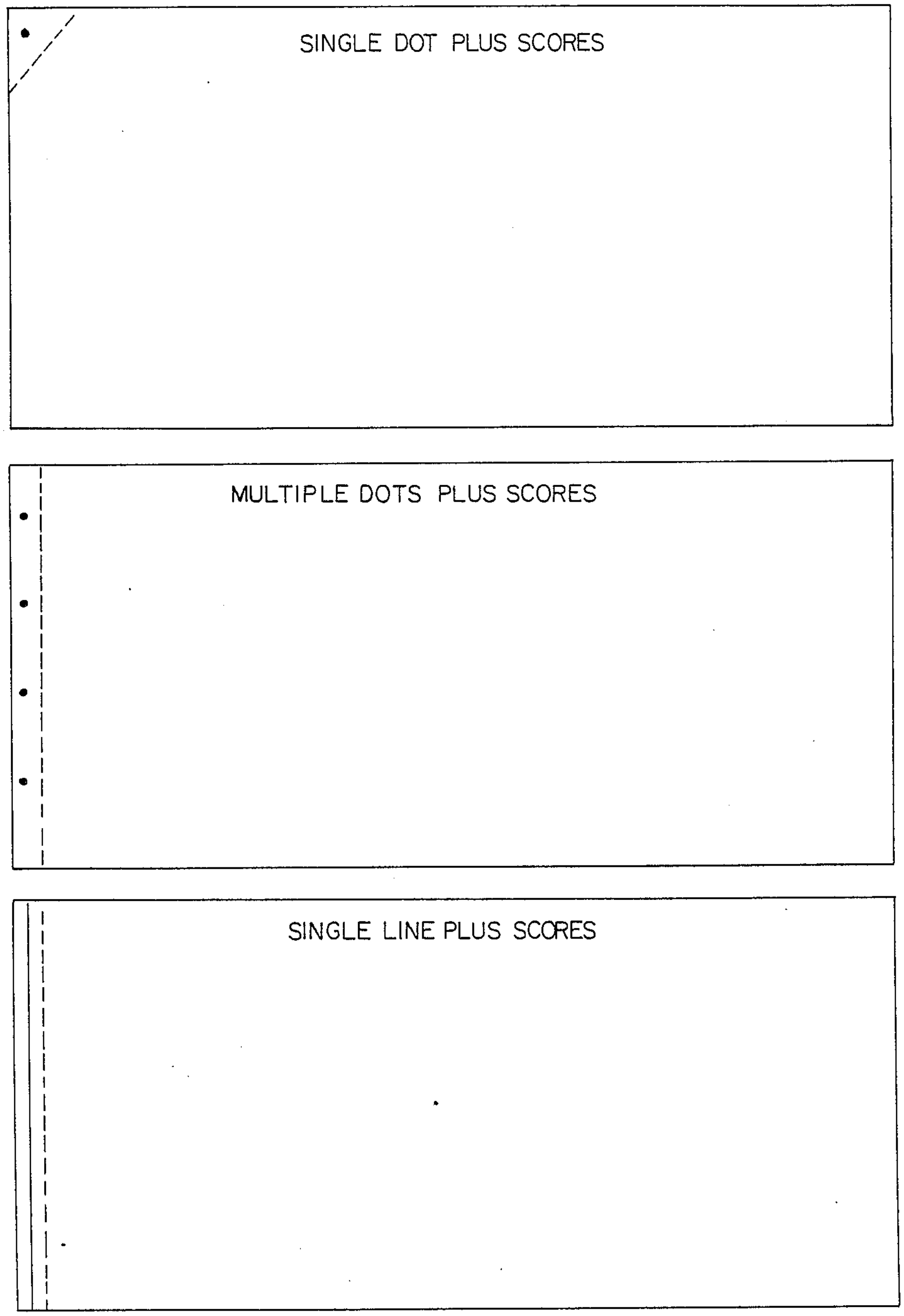
Figure 4:
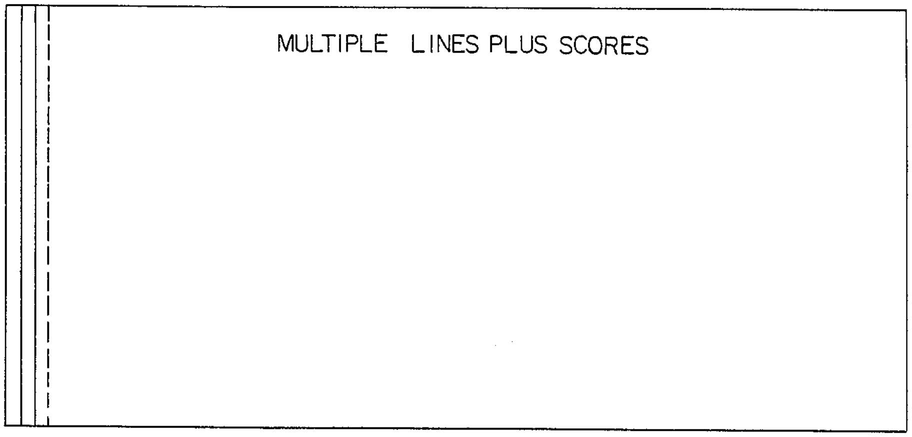

These and other objects and attendant advantages of the present invention will be better understood upon reading of the following detailed description when considered in connection with the accompanying FIGS. 1–4 which are schematic representations of the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference.

The invention comprises a paper, for example note paper, writing paper, drawing paper, bills, checks, money orders, closing flaps of envelopes, and the like to which has been applied an adhesive which allows the article to be affixed to the surface of an object. As used herein the term "adhesive" is defined as a substance capable of holding material together by surface attachment.

Preferred components of the adhesive are dextrin, starches, gum arabic, mucilage, casein latex and the like or combinations thereof. Numerous recipes have been compiled with or without further additives such as glycerol, sugars, acetic acid and various inorganic and organic materials (H. Bennett, *The Chemical Formulary* volumes 1-21, Chemical Publishing Co., N.Y.).

Several such formulations are shown below:

| U.S. Postage Stamp Glue | |
|---|---|
| Gum Arabic | 1 lb. |
| Starch | 1 lb. |

Distilled water sufficient to give desired consistency

| Office Adhesive | |
|---|---|
| Dextrin, yellow | 15 g |
| Water | 20 g |
| Sugar | 2 g |
| Vinegar (3-5%) | 5 g |
| Preservative | 0.1% |

| Label Paste | |
|---|---|
| Casein | 1 lb. |
| Water Ground Mica | 1 lb. |
| Boiling Water | 1 gal. |
| Borax | 0.25 gal. |
| Sodium Fluoride | 0.25 lb. |
| Pine Oil | 1 oz. |

The adhesive may be applied to either the frontside or the backside of the paper, but preferably to the backside.

The adhesive may be applied at any part of the sheet, but preferably close to any of the horizontal or vertical edges of the paper. The more preferred location is about 1 mm to 10 mm away from the top horizontal or left vertical edge of the paper on the backside thereof.

The adhesive may be present on the sheet as a single dot or plurality of dots, or as a single line or a plurality of parallel lines.

The shape of these dots may be square, circular, linear, rectangular, triangular, oval, donut-shaped and the like. The preferred shape of the individual dot is either circular or rectangular. The shape of the line is either straight, zig-zag or wavy. The size and the number of dots or lines determine how strong the affixation of the paper sheet will be for any of the applied adhesives.

Furthermore, number and size of the dots or lines also determine how much of the surface material of the object to which the sheet is attached will be pulled off on removing it from the surface. The diameter of the dot of adhesive may vary from about 0.1 mm to 10 mm. The preferred range is 0.5 mm to 5 mm. The distance between any two dots may range from about 1 mm to 20 mm. The preferred distance is 2 mm to 10 mm. The width of the line may vary from about 0.1 mm to 5 mm. The preferred range is from 1 mm to 3 mm. The distance between any two lines may range from about 1 mm to 5 mm. The preferred distance is 2 mm to 4 mm. To prevent the adhesive on the sheet from drying out or sticking together, the adhesive may be protected by a covering strip or patch comprising metal foil, plastic or paper which adheres minimally and allows facile removal.

Protection of the adhesive may also be achieved by microencapsulating the adhesive, and anchoring the microcapsules onto the paper. On rupturing the capsules by means of pressure from a hard object, such as a coin or fingernail, the adhesive is released and the paper sheet can be affixed to the desired surface. The technology of microencapsulation is well known in the art (Kirk-Othmer's *Encyclopedia of Chemical Technology.* third edition, J. Wiley, N.Y., 15, 470–493 and references therein.), and U.S. Pat. No. 4,536,524 describes microencapsulated epoxy adhesive systems. The adhesive sheets of this invention are attached by moistening the adhesive on the sheet and pressing it to the desired surface. If a microencapsulated adhesive is used the microcapsules are ruptured and the liberated adhesive is again pressed to the desired surface. The use of adhesive formulas as mentioned earlier lead to strong bonding: it is virtually impossible to remove an affixed stamp by hand without destroying it. Using such adhesives, but reducing the surface area of the adhesive to a small dot or thin line or preferably to a plurality of small dots or parallel thin lines, yields surprisingly secure adhesion and unexpectedly allows substantially non-destructive removal from the surface of attachment. By grasping the attached sheet and pulling it in the direction of the edge which bears the dot, dots, line or lines of adhesive, results in virtually flawless separation without substantially damaging the surface of attachment. Alternatively, the detachment of the attached sheet can be facilitated by an array of cut scores or perforations which are located substantially close or parallel to the adhesive dot, multitude of dots, line or multitude of lines. By pulling the attached sheet away from the dot, line or multitude of dots or lines, the sheet separates from the surface of the attachment leaving a small strip of the sheet to the surface of attachment.

It is understood that the examples and embodiments described herein are for illustrative purposes only and that various modifications or changes in light thereof will be suggested to persons skilled in the art and are to be included within the spirit and purview of this application and scope of the appended claims.

It should be quite clear from the above that the unexpected result obtained by the embodiments of the present invention is due to the limited or sparing use of the permanently bonding adhesives or glues in a manner which allows substantially intact removal of the bonded material. Heretofore, the use of these adhesives or glues was to permanently fix the paper so that the glued paper could not be detached without tearing apart the paper article. Now with the use of only a micro-dot or micro-thin line amount of adhesive on a non-essential portion of the paper, a secure fixation of the paper article is obtained while allowing detachment of the same paper article by merely pulling it apart without substantial damage to said paper item. Micro-dot or micro-thin line amount means a minimum size and amount of the adhesive dot or line which renders the paper item unremovably fixed until pulled apart.

What is claimed is:

1. A first paper that can be adhesively secured to a second paper from which the first paper can be removed substantially intact, comprising a first paper having a single dot or line or a plurality of dots or lines of an adhesive disposed at a nonessential portion of the first paper, the first paper being removable substantially intact from second paper to which said first paper is securely attached by said adhesive, wherein said single dot or line or plurality of adhesive dots or lines are protected by protecting means other than paper

2. The paper of claim 1 wherein said single adhesive dot or line or plurality of adhesive dots or lines is microencapsulated.

3. The paper of claim 1, wherein said adhesive dot is about 0.5 to 5 mm in diameter.

4. The paper of claim 1, wherein said adhesive line is about 0.5 to 3 mm in width.

5. The paper of claim 1, wherein said paper is a bank cheque.

6. The paper of claim 1 wherein the adhesive is bordered by cut scores.

7. A method of detaching a paper article, comprising applying microdot or microline amount of an adhesive protected by protecting means other than paper on a nonessential portion of a first paper article; (b) pressing said paper article of step (a) to a second paper article for securing the first paper article to the second paper article; and (c) then separating the first paper article from the second paper article by pulling apart the first paper article from the second paper article.

8. The paper of claim 1 wherein said protecting means is selected from the group consisting of a metal foil and plastics.

9. The paper of claim 8 wherein said protecting means is a metal foil.

10. The paper of claim 8 wherein said protecting means is a plastics.

11. The method of claim 7 wherein said protecting means is selected from the group consisting of a metal foil and plastics.

12. The method of claim 11 wherein said protecting means is a metal foil.

13. The method of claim 11 wherein said protecting means is a plastics.

14. The method of claim 7 wherein the adhesive is bordered by cut scores.

* * * * *